No. 756,310. PATENTED APR. 5, 1904.
J. WILLMANN.
APPARATUS FOR HEATING OR STERILIZING LIQUIDS.
APPLICATION FILED JULY 16, 1903.
NO MODEL.
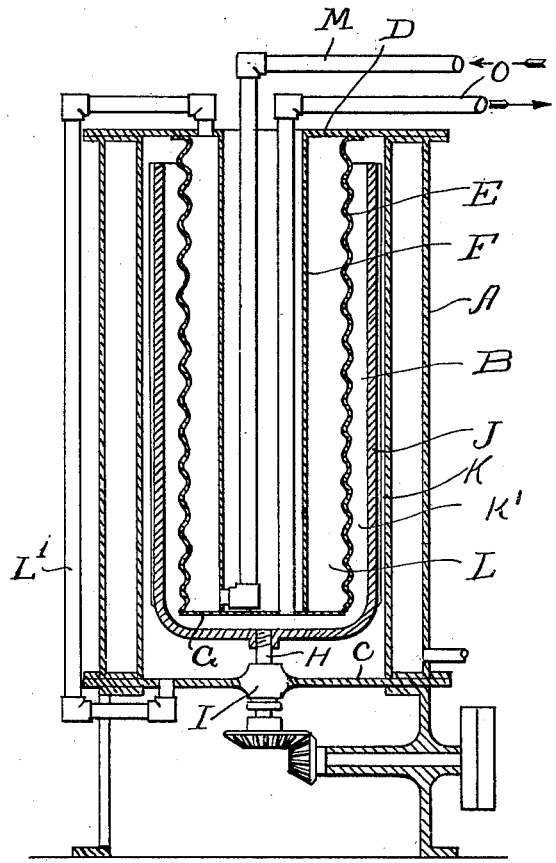

No. 756,310. Patented April 5, 1904.

UNITED STATES PATENT OFFICE.

JOSEPH WILLMANN, OF CHICAGO, ILLINOIS.

APPARATUS FOR HEATING OR STERILIZING LIQUIDS.

SPECIFICATION forming part of Letters Patent No. 756,310, dated April 5, 1904.

Application filed July 16, 1903. Serial No. 165,885. (No model.)

*To all whom it may concern:*

Be it known that I, JOSEPH WILLMANN, a citizen of Germany, residing at Chicago, in the county of Cook and State of Illinois, have invented certain new and useful Improvements in Apparatus for Heating or Sterilizing Liquids; and I do hereby declare the following to be a full, clear, and exact description of the invention, such as will enable others skilled in the art to which it appertains to make and use the same.

My invention relates to a novel construction in an apparatus for heating or sterilizing liquids, the object being to provide a simple and efficient apparatus of this character which is particularly adapted for sterilizing or pasteurizing milk; and it consists in the features of construction and combinations of parts hereinafter fully described and claimed.

The accompanying drawing, illustrating my invention, shows my apparatus in central vertical section.

My said apparatus consists of an annular heating-drum A, connected with a source of supply of a heating fluid, and within which is a cylindrical chamber B, adapted to receive the liquid to be heated or sterilized and which is closed at its lower end by means of a head C. At the upper end of said drum A is an inwardly-extending annular flange D, from which two concentric cylinders E and F depend, which terminate at a point above the bottom of the chamber B and are closed at their lower ends by means of the head G. Passing centrally through said head C is a vertical shaft H, journaled in a stuffing-box I and carying an inverted bell J at its upper end which receives the cylinders E and F and rotates between the cylinder E and the drum A, said drum acting as a stirrer to agitate the liquid and prevent same from coagulating on said drum and dividing the space between said cylinder E and the inner wall of the heating-drum into two annular spaces K and K', communicating with each other at their upper ends, and at the same time acting as an isolator to prevent the liquid contained in said bell from being further heated from said drum. Said shaft H is suitably geared to a source of power by means of which it is rotated.

The liquid is introduced into the lower end of the annular chamber L, between the cylinders E and F, by means of a pipe M, and passes upwardly through said space. Thence it passes through a pipe L' to the lower end of the annular space K and passes upwardly therethrough and is heated to the desired temperature during such passage. Then it flows over the upper edge of said bell and into the annular space K', the cylinder E being preferably corrugated to increase its surface. From said space K' the liquid is exhausted through the pipe O. It will be noted that the cool liquid introduced into the chamber L passes upwardly along the inner face of said cylinder E, while the heated liquid passes downwardly along the outer face thereof, and during such passage the cooler liquid absorbs a large part of the heat of said hot liquid, so that the latter is cooled and the former heated, such interchange of temperature effecting considerable economy of steam or other heating fluid.

I desire to call attention to the fact that if my said apparatus is inverted the action will be exactly the same.

My said apparatus is both simple and efficient, and is particularly adapted for sterilizing or pasteurizing milk.

I claim as my invention—

An apparatus of the kind specified comprising an annular heating-drum, an annular chamber of less height and diameter than said drum concentric therewith and projecting into one end of the cylindrical chamber in the center of said drum, a shaft entering said cylindrical chamber at its other end, a bell carried thereby of less diameter than said drum and greater diameter than said annular chamber and projecting into the space between said drum and said annular chamber to divide said space into inner and outer annular spaces communicating with each other at one end, a feed-pipe entering said annular chamber at one end, a pipe establishing communication between said annular chamber at its other end and the opposite end of the outermost of said annular spaces, and an exhaust-pipe leading from the corresponding end of the innermost of said annular chambers, substantially as described.

In testimony whereof I affix my signature in presence of two witnesses.

JOSEPH WILLMANN.

Witnesses:
   RUDOLPH WM. LOTZ,
   WM. B. SNOWHOOK.